3,083,534
SERVO MECHANISM FOR CONTROLLING
VARIOUS MEMBERS
René Bergounhon, Paris, and Guy Bellanger, Asnieres,
France, assignors to Adar S.A.R.L., Paris, France, a
company of France
Filed June 27, 1961, Ser. No. 119,928
Claims priority, application France June 27, 1960
8 Claims. (Cl. 60—51)

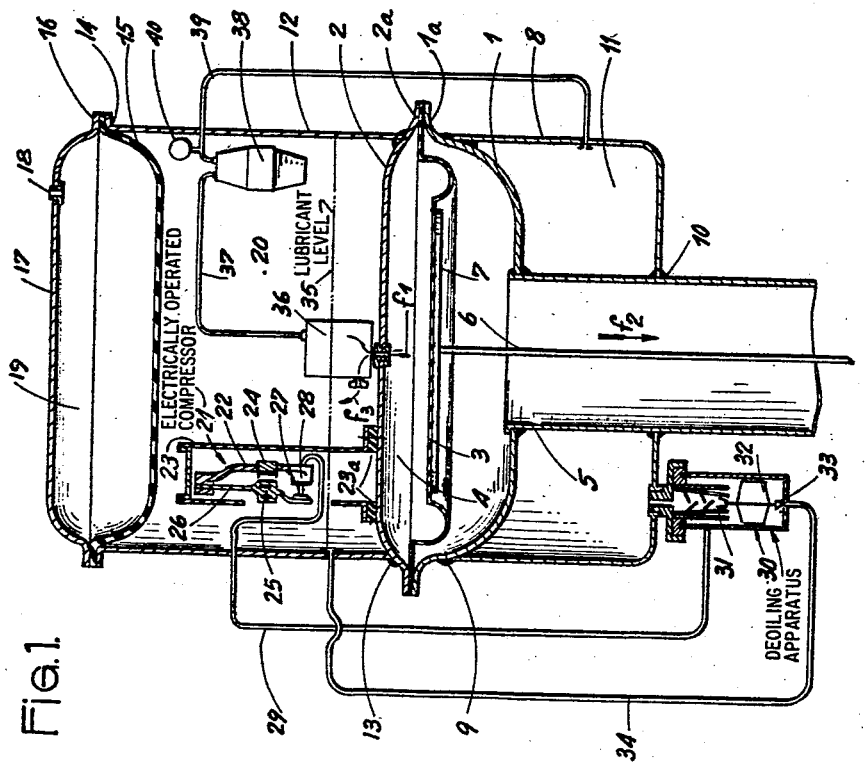

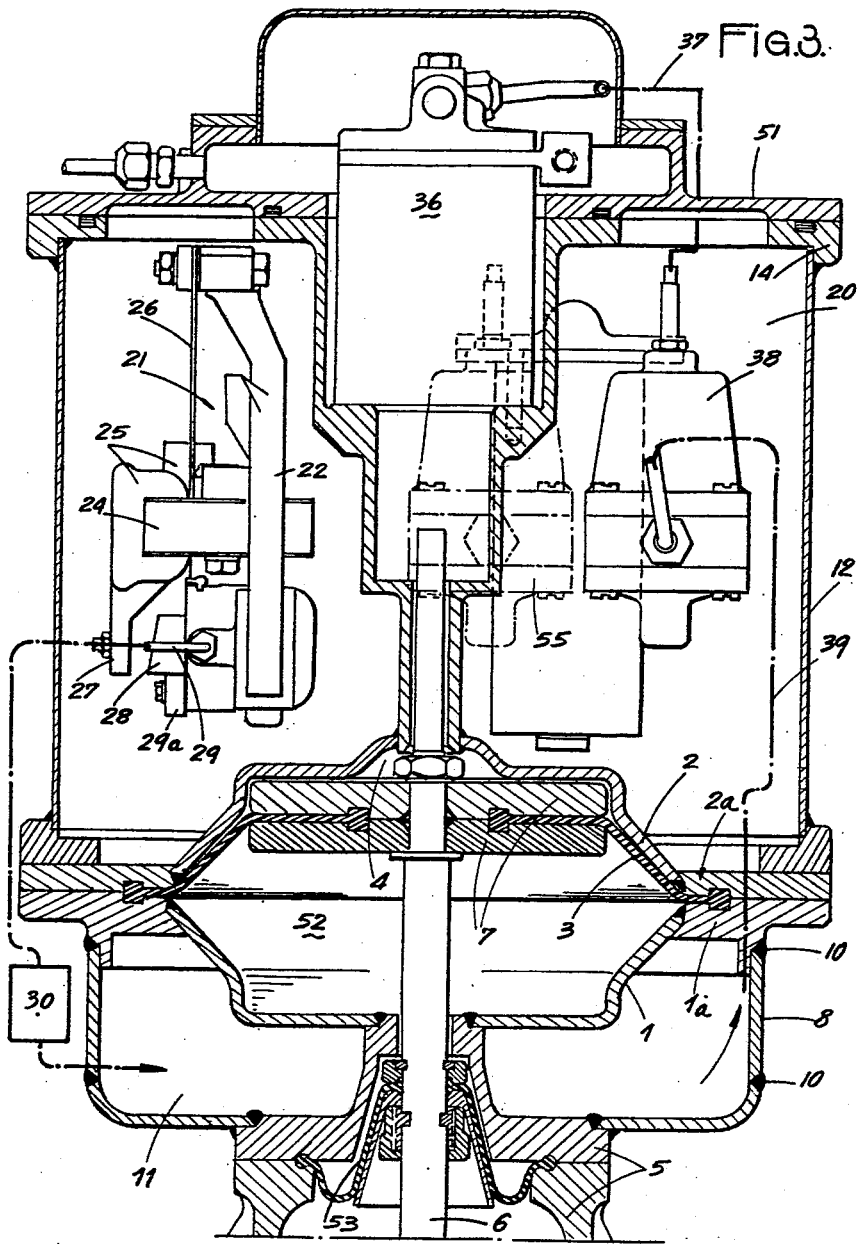

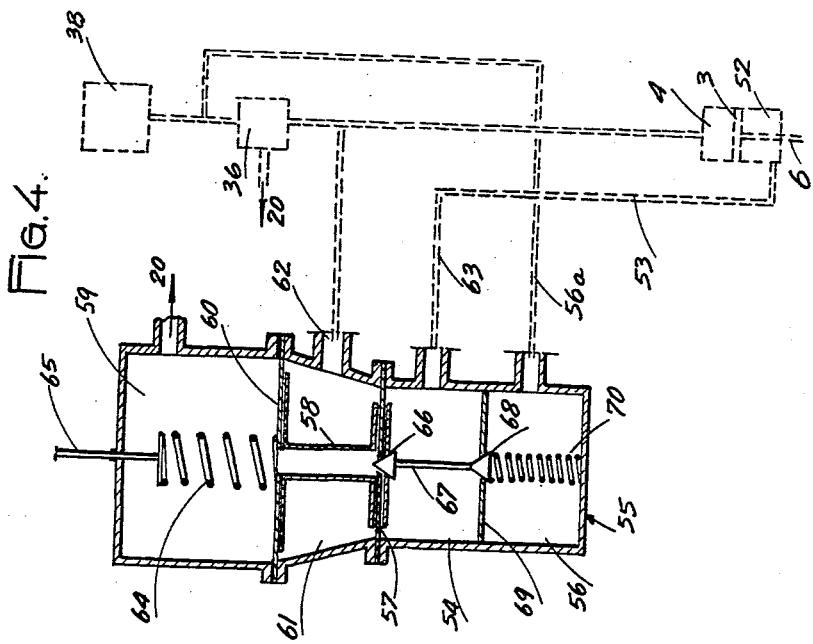
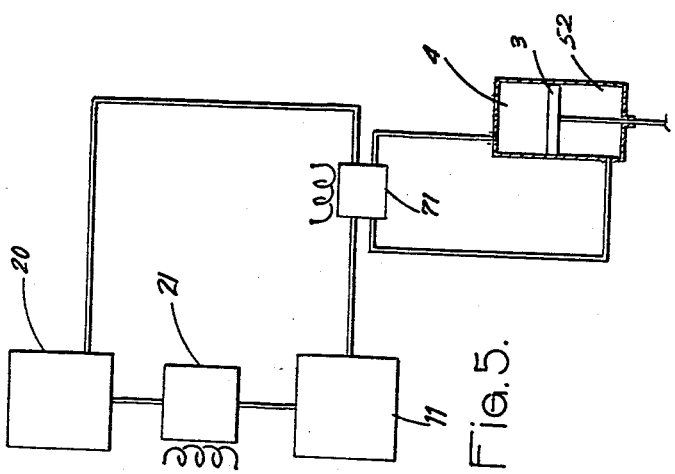
INVENTORS
RENE BERGOUNHON
GUY BELLANGER

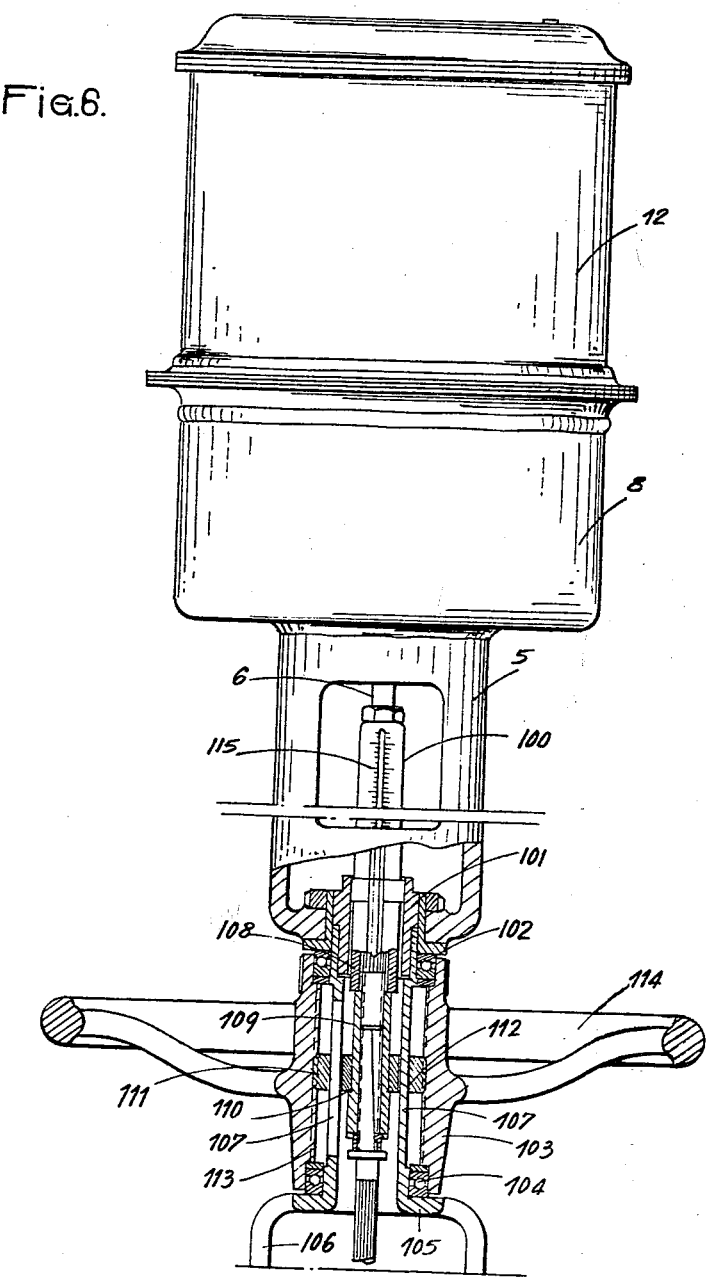

The present invention relates to a device for controlling members or various mechanisms whose movements as slave devices must be automatically effected, either from the exteriors of their housings, or from a distance, as from a remote control distributor switchboard.

The purpose of the invention is to provide a new servo-mechanism device capable of instantaneously, or with lapse of a very short time, controlling the desired movement of a load element, the device being operable by impulses, currents or other low powered signals.

According to the invention, the device comprises at least one mobile diaphragm connected to an external operating element to move the element and a load connected thereto, the diaphragm being placed in a container which is alternately put into communication, by a distributing member, with a tank containing a fluid under pressure and with an enclosed space containing similar fluid, but under lower pressure, said enclosed space and said tank being, moreover, connected by a duct having an electrically operated motor compressor unit for sucking the fluid from said enclosed space and delivering it into said tank, so long as the pressure in the latter is below a selected value measured by an element sensitive to the pressure and operating to electrically start and stop the motor compressor.

Various other characteristics of the invention will be revealed by the detailed description which follows.

Forms of embodiment of the invention are shown, by way of non-restrictive examples, in the attached drawing.

FIGURE 1 is a vertical, diagrammatic section showing one embodiment of the servo mechanism device according to the invention.

FIGURE 2 is a diagrammatic section similar to FIGURE 1, showing an alternative embodiment.

FIGURE 3 is a view similar to FIGURE 1 showing a third embodiment, certain parts being shown in elevation.

FIGURE 4 is a diagram showing the connections between certain of the members appearing in FIGURE 3.

FIGURE 5 is a diagram showing a fourth embodiment of the invention.

FIGURE 6 is an elevation, partly in section, of an entire unit according to the invention with further modifications.

According to the drawing and particularly FIGURE 1, the device comprises a casing 1 closed by a lid 2. The edges 1a and 2a of the casing and lid secure the periphery of a diaphragm 3 which delimits between its upper wall and the bottom of the lid 2, a chamber 4, hereafter called the control chamber.

The casing 1 is supported by a barrel 5, which may be cylindrical, in which a rod 6 is placed and guided. The rod is connected by at least one plate 7, to the diaphragm 3. The rod 6 is intended to move a receiving mechanism or slave device of any kind. The receiving mechanism may be merely an intermediate mechanism between the device of the invention and the operated member.

The casing 1, for example is also sealed at its upper end to a sheath 8, by means of solder 9, the sheath also being attached to the barrel 5 by means of solder 10 so as to delimit a perfectly tight-fitting annular tank 11.

In like manner, the lid 2 supports an envelope 12 on its top fixed and sealed by solder 13, the envelope having its upper edge shaped so as to form a flange 14 on which is secured the peripheric edge of a distortable flexible diaphragm 15 by means of a flange 16 formed on a closing hood 17 having at least one hole 18. The diaphragm 15 thus delimits, with the hood 17, a compartment 19 at atmospheric pressure and with the interior of the envelope 12 a closed space 20 of relatively great capacity.

The closed space 20, the control chamber 4 and the tank 11 are completely filled with a charge of a compressible fluid which may be, for example, nitrogen. The pressure variations, as well as the transfer of nitrogen from one to the other of the containers described above, are controlled and operated by various members hereafter described, which are advantageously placed in the enclosed space 20 whose envelope 12 is thus used as a protecting element for these members.

One of the members intended to put the compressible fluid charge into circulation is a vibrating compressor or motor compressor unit denoted by the reference 21. It has been found advantageous to use an electromagnet vibrating device as the compressor, which, in the example shown diagrammatically, comprises a body 22 suspended from a support 23 itself fixed by studs 23a on the top of the lid 2. The body 22 is an integral part of a magnetic circuit 24 comprising at least one coil supplied with alternating current so as to set up an alternating magnetic field in the magnetic circuit 24, which field has the effect of maintaining the vibration of an armature 25. The armature is advantageously provided with permanent magnets and suspended from a calibrated resilient element 26 acting to operate a compressor element 27 cooperating with a cylinder block 28 supported by the body 22.

The cylinder block 28 is connected by piping 29, to a cartridge 30 which is advantageously fixed below the tank 11, but which could be placed inside this tank. The cartridge 30 contains a deoiling element 31 at its upper part, and a float 32 at its lower part which controls a valve 33 governing the communication of the inside of the lower part of the cartridge with a conduit 34 which emerges in the enclosed space 20 at a certain distance above the lid 2.

As can be clearly seen from the foregoing, when the vibrating compressor or motor compressor 21 is operated the compressible fluid is sucked up inside the enclosed space 20, and forced through the piping 29 into the cartridge 30. During operation, the vibrating compressor 21 is lubricated by members such as 29a, FIG. 3, drawing oil from the bottom of the enclosed space 20, this oil rising appreciably up to the level denoted by the reference 35, i.e.; substantially up to the level where the conduit 34 emerges. The members 29a are parallelepipedally shaped pieces of porous material such as sintered bronze which dip in the oil and by capillarity deliver the oil to the cylinder through a hole in the cylinder block 28. Such structure is well known and conventional and, therefore, will not be described in further detail. The oil carried along at the same time as the compressed fluid through the piping 29 is separated from this fluid by the deoiling element 31 and flows into the bottom of the cartridge 30. Simultaneously, the fluid under high pressure which fills the cartridge is conveyed into the tank 11 which is in communication with the upper part of this cartridge.

When the oil level inside the cartridge 30 reaches a level sufficient to raise the float 32 and connected valve 33 the orifice of the conduit 34 is opened, and part of the oil is thus delivered into the enclosed space 20 because the pressure prevailing inside the cartridge 30 is appreciably greater than that existing in said enclosed space 20.

Another of the members contained in the enclosed space 20, is a distributing mechanism 36, preferably electrically operated. This mechanism, well known in itself, is so arranged as to put into communication, according as to whether it is actuated or not, either the control chamber 4 with the enclosed space 20 or the control chamber 4 with an inlet conduit 37 for the fluid under pressure in tank 11.

In the example shown, conduit 37 is branched on to the output of a pressure regulating release 38 also placed in the enclosed space 20. The input of this pressure regulating release is connected by a pipe 39 to the tank 11 containing the compressible fluid under high pressure.

In order to operate the servo device automatically and to maintain the pressure in the tank 11 always substantially constant, it has been found advantageous to govern the operation of the vibrating compressor 21 by a device sensitive to the pressure prevailing in tank 11. To this end, a device of this kind which operates in response to pressure variations is placed inside the enclosed space 20 at 40, immediately above the input of the regulating release 38. As a result, when the pressure in the tank 11 lowers, the vibrating compressor 21 is immediately supplied with electric current and, when the pressure in this tank 11 reaches a sufficient value, the electric feed of said motor is cut out.

The connecting of the vibrating compressor into and out of circuit being automatically controlled, to complete operation of the servo-mechanism device described above, it is only necessary to drive the distributor member 36, which can be easily effected electrically.

As can be easily understood, when the member 36 is actuated to put the conduit 37 into communication with the control chamber 4, the fluid under controlled pressure coming from the tank 11, by means of the regulating release 38, passes into said member 36 in the direction of the arrow $f_1$, which causes a rapid easily adjustable rise in the pressure in the chamber 4. This rise in pressure causes the distortion of the diaphragm 3, and consequently the extension in the direction of the arrow $f_2$ of the operating rod 6 which thus moves the receiving mechanism to which it is connected.

When the operating rod 6 must be moved in the opposite direction, the distributing member 36 is impelled in the other direction resulting in the fluid under relatively high pressure contained in the control chamber 4, being directed or exhausted into the enclosed space 20 in the direction of the arrow $f_3$.

This transfer of the fluid into the enclosed space tends to cause a rise in pressure, but this is prevented owing to the distortion undergone by the diaphragm 15, hence it results that the pressure in the enclosed space 20 only rises very slightly, to an extent corresponding to the pressure required for causing the distortion of said diaphragm 15. In this way, the compressor contained in the enclosed space 20 always works under similar pressure conditions with an intake pressure which remains appreciably constant.

In the preferred case of utilising a vibrating motor compressor electromagnetically driven, it is advantageous to mount a non-return valve on the delivery conduit 29.

In the alternative embodiment according to FIGURE 2, the casing denoted by the reference $1_1$ is of very large dimensions so that it delimits a volume comparable to that enclosed by the envelope 12 shaped as per FIGURE 1. The underside of the plate 7 is attached to the diaphragm 3 and is provided with a sole-piece 42 to which the upper part of the distortable bellows 43 is soldered, the lower part of the bellows apron being soldered to the end of the barrel 5. The large volume container delimited by the casing $1_1$, the bottom of the diaphragm 3, the barrel 5 and the bellows 43 forms an enclosed space $20a$ similar to the enclosed space 20 described with reference to FIGURE 1. As in the former case, this enclosed space contains the motor compressor 21, the pressure regulating valve 38 and an oil mass for lubricating the moving parts of the motor compressor 21. The distributing mechanism 36 is, in this form, placed as in the previous case on the lid 2, which also supports an annular sheath 44 internally delimiting the high pressure tank 11. A de-oiling cartridge 30 is provided on the delivery pipe 29 of the compressor, this cartridge being connected to the high pressure chamber by a conduit 45 and to the enclosed space $20a$ by a conduit $34a$ similar to the conduit 34. Communication of the conduit $34a$ with de-oiling cartridge 30 is controlled in a similar manner to that described with reference to FIGURE 1.

As will be easily understood, the fluid delivered under pressure by the vibrating compressor 21, when the latter is made to deliver under the influence of the signal transmitted to it by the device 40 operating in response to the pressure variations produced in the enclosed space 11, is led by the conduit 29 through the de-oiling cartridge 30, then by the conduit 45 into the high pressure tank 11. For actuating the rod 6, it suffices to drive the regulating distributor 36, so as to deliver part of the compressible fluid under high pressure in the tank 11 into the control chamber 4. This delivery produces the distortion of the diaphragm 3, and consequently, the extension of the rod 6 at the same time as the compression of a spring 46, whose tension can be pre-regulated by calibrating member 47. Owing to the distortion undergone by the diaphragm 3, the effective volume of the enclosed space $20a$ is progressively reduced, but this reduction in volume is desirable because the pressure variation resulting from delivery of fluid from the tank 11 to the chamber 4 causes the coming into operation of the compressor which sucks up the fluid in said enclosed space. In this way, the pressure variations produced in space $20a$ during the distortion of the diaphragm 3 are slight. When the rod 6 requires to be moved in the opposite direction, the regulating distributor 36 is again actuated, but so that it produces the delivery of the fluid under pressure contained in the control chamber 4 into the enclosed space $20a$. This is enabled by a conduit 47 connecting the output of said regulating distributor to the enclosed space $20a$.

When fluid is delivered into space $20a$, the spring 46 is progressively released, and consequently, the diaphragm 3 is again distorted so as to move and occupy the position shown in the drawing, or an intermediate position. This distortion has the effect of increasing the volume of the enclosed space $20a$ at the same time that the fluid under pressure is delivered into the enclosed space, and consequently, the pressure thus varies only slightly.

So that the oil fumes that are likely to be carried along into the high pressure tank 11 at the same time as the compressible fluid is returned into the enclosed space $20a$, it is advantageous to make the conduit 45 emerge into the lowest part of this high pressure tank, enabling the oil condensed in the high pressure tank to flow by gravity and return to the cartridge 30 through said conduit 45, when the compressor is not working. Furthermore, it is advantageous, in the control chamber 4, to arrange a flexible pipe 48 whose outlet is placed at the lowest point of the diaphragm 3. This flexible pipe is connected by a cock 49 and a pipe 50 to the enclosed space $20a$. The oil accidentally brought into the chamber 4 can thus be extracted and returned into the enclosed space $20a$ by periodically opening the cock 49. The pressure in the control chamber 4 being always greater than the pressure in the enclosed space $20a$, even if this latter pressure is greater than atmospheric pressure, causes the discharge of the oil in the same way as described above with reference to FIGURE 1 for the working of the de-oiling cartridge 30.

As is clear from the preceding description, the device of the invention utilizes a fluid circulating in a closed container, and consequently, this fluid is kept free from any impurity, which is a considerable advantage as the relatively fragile members used for putting the fluid into circulation run no risk of becoming deteriorated by the introduction of foreign matter.

Furthermore, because the device is electrically operated, it can be easily remotely controlled from a distributing switchboard which permits and ensures the control of any number of devices similar to the one described. Therefore the control is possible of a large number of mechanisms which must operate simultaneously, or in time relation with each other whether these various mechanisms are placed close to one another or are separated by long distances.

In the alternative embodiments of FIGURES 3 to 5, the same reference numbers denote the same members as in FIGURE 1.

Referring to FIGURE 3, the flange 14 provided on the envelope 12 supports a lid 51 intended to ensure the closing in a completely tight-fitting manner of the envelope 12 which thus bounds the enclosed space 20, of relatively large capacity.

The enclosed space 20 contains various members, particularly the vibrating compressor or motor compressor unit 21, whose cylinder block 28 is connected by piping 29 to the de-oiling cartridge 30 which communicates with the interior of the chamber 11 filled, as well as the enclosed space 20, with a charge of gaseous fluid, such as nitrogen.

In addition the enclosed space 20 contains the relief valve regulator mechanism 38, connected by a pipe 39 to the chamber 11 communicating with the delivery of the motor compressor unit 21 so that chamber 11 forms a high pressure chamber. A conduit 37 connects the electrically operated distributor mechanism 36 so as to put into communication—according as to whether it is actuated in one direction or another—the chamber 4 delimited above the diaphragm 3 with the enclosed space 20, or, on the contrary, this same chamber 4 with the high pressure chamber 11, but in conditions that are referred to hereafter.

In FIG. 3, contrarily to what is described with reference to FIGURE 2, the diaphragm 3 is not subjected to the action of a resilient element tending to lift it. The underside of the diaphragm 3 forms, with the interior of the casing 1, a container 52 whose tight seal is ensured by means of a second diaphragm 53 fixed to the rod 6 and on the barrel 5. The container 52 as well as the chamber 4, is supplied with gas under pressure, so as to ensure the selective drive, in one direction or the other, of the rod 6. For this, and as shown more particularly in FIGURE 4, the container 52 is connected by a tube 63 to a chamber 54 having a reversing relay 55 which is conventional. The reversing relay has a container 56 underneath the chamber 54, connected by a conduit 56a to the output of the regulator 38. The top part of the chamber 54 is closed by a diaphragm 57, which, at its middle part, has a port delimited by the end of a tube 58 which communicates the chamber 54 with a cavity 59 in turn connected with the enclosed space 20, forming the low pressure chamber of the device. The upper part of the tube 58 is connected to a second diaphragm 60 which thus delimits, between the cavity 59 and the chamber 54, an annular housing 61 connected by a conduit 62 to the output of the distributor mechanism 36, and also with the control chamber 4 formed between the diaphragm 3 and the lid 2 of the casing 1. The two diaphragms 57 and 60 are connected with each other, but, as shown by the drawing, their surfaces are different, that of the diaphragm 60 being larger than that of the diaphragm 57. The underside of diaphragm 57 is permanently subjected to the pressure prevailing in the container 52 delimited in the casing 1 below the diaphragm 3, this container being connected to said chamber 54 by a conduit 63. Since the cavity 59 of the reversing relay 55 is, as explained above, at the same pressure as that prevailing in the enclosed space 20, a calibrating spring 64 is provided, subjected to a regulating member 65 and acting on the top of the diaphragm 60 so that this diaphragm, as well as the diaphragm 57 with which it is mechanically integral, is placed in a position so that the conduit 58 is plugged by the needle 66, when the diaphragm 3 controlling the displacement of the rod 6 must be in the balance position, i.e., when said rod 6 must not be displaced. The needle 66 is carried by the stem 67 of a valve 68 which closes a communicating aperture provided in a partition 69 separating the chamber 54 from the container 56. To prevent the weight of the needle 66-valve 68 unit from interfering with the proper working of the reversing relay, said valve 68 is subjected to the action of a counter-balancing spring 70.

As is now clear from the preceding description, in the embodiments of FIGURES 3 and 4, the vibrating compressor 21 sucks up the gaseous fluid contained in the enclosed space 20, and delivers this fluid, after separating the oil in the cartridge 30, to the chamber 11 which thus forms a power accumulator. The operation of the vibrating compressor 21 is controlled automatically by a device sensitive to the pressure prevailing in the chamber 11. The pressure in the chamber 11 being variable dependent on the operational frequency of the servo device and also the conditions of the ambient temperature, a relief valve regulator member 38 is provided for delivering—when the compressor is put into operation—a fluid under practically constant pressure.

Referring again to FIGURE 4, when it is required to actuate the device in the direction for which the rod 6 must slide downwards (extend), the distributor mechanism 36 is energized by any suitable means, which has the effect of admitting the regulated high pressure coming from the relief valve 38 into the control chamber 4. This high pressure is also admitted through the conduit 62 into the annular housing 61 of the reversing relay, and owing to the difference of the effective surfaces of the diaphragms 57 and 60, the latter are moved upwards against the action of the spring 64, so that a communication is set up through the tube 58 between the chamber 54 and the cavity 59. The chamber 54 being in communication with the container 52 below the diaphragm 3, it follows that part of the fluid in the container 52 is in this way delivered into the chamber 54, then directed through the tube 58 and cavity 59 towards the enclosed space 20. The pressure in the container 52 becoming lower and lower, it follows that a lower pressure is also applied to the underside of the diaphragm 57 of the reversing relay. When the pressure in the container 52 has sufficiently lowered, the resultant pressure exerted on both diaphragms 57 and 60, is again balanced by the calibrated spring 64 which consequently returns said diaphragms to the position shown, for which the communication between the container 52 and the enclosed space 20 is interrupted, so that a new balance of the diaphragm 3 and connected rod 6 is thus obtained, for any desired positions of these parts.

When an operation opposed to that described above must be effected, i.e., when the rod must be raised (retracted), the distributor 36 is again energized, but in the direction in which it puts the control chamber 4 into communication with the interior of the enclosed space 20. The progressive drop of pressure in the control chamber 4 is transmitted by the conduit 62 into the annular housing 61 of the reversing relay 55, so that the action of calibrated spring 64 becomes preponderant to that of the resultant of the pressure forces exerted on the diaphragms 57 and 60. This results in a downward distortion of said diaphragms 57 and 60, and consequently, the valve 68 is lowered from its seating and puts the chamber 54 into communication with the container 56 which is connected by the conduit to the high pressure coming from the relief valve 38. This high pressure is consequently transmitted through the conduit 63 into the container 52 raising the diaphragm 3 and displacing the rod 6 upwardly. As soon as the supply of electric current to the distributor 36 ceases the decanting of the fluid contained in the chamber 4 towards the enclosed space 20 also ceases, and consequently, the pressure can no longer decrease in the annular housing 61 of the reversing relay 55. The pressure developed in the container 52 tending to continue to increase has the effect of again raising the diaphragms 57 and 60 up to the moment when the pressure of the calibrated spring 64 is again balanced, and hence, up to the moment when the valve 68 is returned to a position for which it stops all communication between the container 56 and the chamber 54.

As can be seen from the foregoing, the fluid feeds to both the control chamber 4 and the container 52, enable absolutely balanced positions of the diaphragm 3 to be obtained, which makes an extremely accurate adjustment possible of the member that is to be operated by the rod 6.

When the member to be moved by rod 6 must not be locked in various positions, but is to be completely moved a given distance in one direction or the other, it is obviously possible to simplify the device as shown diagrammatically in FIGURE 5. The enclosed space 20 no longer contains the vibrating compressor 21 acting to deliver the fluid under pressure into the tank 11, nor an electrically operated distributor 71, enabling the control chamber 4 of the casing 1 to be put into communication with the tank 11 or the enclosed space 20. The distributor 71 is capable of putting the container 52 into communication with the enclosed space 20.

In this manner, it is possible to omit the relief valve 38, and the special distributor 36 and the reversing relay 55, described above with reference to FIGURES 1, 2 and 4.

It has been found advantageous to include in the servo-motor device, according to any one of the preceding figures, a safety member, making manual control possible. FIGURE 6 illustrates how this safety device is made. The rod 6 supports a guiding part 100, slidably mounted in a sheath 101 which is itself supported by the lower part of the barrel 5. The barrel is supported on a socket 103, which is integral with handwheel 114, by upper and lower bearings 102 and 104. This second bearing 104, which forms an abutment bearing, is mounted in a journal 105 formed by a base 106 integral with or extended on the receiving member that is to be controlled.

The base 105 forms longitudinal guides 107, extending parallel to and concentric with the rod 6, which supports at its top part, a bushing 108 of relatively large diameter, and immediately underneath this bushing, a sheath 109 of smaller diameter than the bushing 108, but having, at its low part, a shoulder piece 110. The smaller diameter part of the sheath 109 extends over an appreciably greater length than the stroke that said rod 6 is able to make, when it is automatically controlled by the mechanism described with reference to the preceding figures.

The numeral 111 denotes an externally threaded crown having holes 112 in which the guides 107 are engaged. This threaded crown is screwed in a tapping 113 in the socket 103, integral with hand-wheel 114, for manual actuation by the latter.

As can be seen from the foregoing, when the device works normally, and is subjected to the automatic control described with reference to the preceding figures, the threaded crown 111 is so placed that it does not hinder the free axial displacement of the rod 6, i.e., so that it does not run the risk of coming into contact either with the bushing 109 or the shoulder-piece 110.

In the event of the automatic control being damaged, which may occur in various ways, and which may be noted by the position of the graduation 115 borne by the guide 100, the rod 6 may be moved by revolving the hand-wheel 114 in one direction or the other, so that the threaded crown 111 is axially displaced, being that it is prevented from revolving by the guides 107. The crown is thus brought either into contact with the bushing 108, which causes the rod 6 to rise, or into contact with the shoulder-piece 110, which causes the lowering of said rod 6.

It is desirable to subject the electric current supply, both of the vibration compressor 21 and the distributor 36, or the distributor 71, to a control device sensitive to the pressure prevailing in the enclosed space 20. The pressure sensitive device should be calibrated so that no current is supplied if the pressure in the enclosed space 20 falls below a given value above atmospheric pressure.

This latter device is intended to avoid any accident should air or other oxidizing fluid penetrate into the device, owing to a leak due, for example, to the bursting of a diaphragm.

The invention is not restricted to the examples of embodiment shown and described in detail, for various modifications may be applied without exceeding its scope. In particular, it is possible to provide a distributing member 36 such that its delivery can be regulated at the same time that it controls the transfer of the fluid under pressure from one container to another, which enables the response time of the device to be regulated.

Moreover, in certain installations, the release regulating member 38 can be eliminated, and likewise, it is possible, if so required, to utilize a vibrating compressor unit other than that succinctly described in the foregoing.

In certain applications, it has been found advantageous to employ as the compressible fluid a product, generally used as a refrigerating medium, in a vapour state in the enclosed space 20 or 20a and in a liquid state in the tank 11. In this case, the tank is connected to the compressor by a condenser coil for changing of the state of the fluid.

It is also possible, within the scope of the invention, to provide a pilot device similar to those described above with reference to the drawing, and satellite devices comprising merely casings 1 enclosing the diaphragms 3, and a distributing member 36 on each satellite casing whose input and output conduits are connected respectively to the regulating release 38 and the enclosed space 20 of the pilot device.

We claim:

1. A servo-mechanism unit for the movement of a rod intended to move a load device comprising a tubular assembly partially surrounding and guiding said rod, a distortable diaphragm closing one end of said tubular assembly and secured to said rod, a lid covering said distortable diaphragm and forming therewith an actuating chamber, a first casing mounted on said end of said tubular assembly and forming a first tank, a second casing carried by said lid and forming a second tank, said first and second tanks and said actuating chamber being filled with a charge of fluid, an electrically operated pumping device located inside one of said tanks and operative to withdraw fluid from the said one tank and force said fluid into the other tank, an element sensitive to the pressure in said other tank to stop and start said pumping device so that pressure is maintained substantially constant in said other tank, and an electrically operated distributing device for conducting fluid from said other tank to said actuating chamber when actuated in one direction and to at least in part discharge fluid from said actuating chamber to said one tank when actuated in a second direction thus causing said diaphragm to be distorted successively in two directions for correspondingly moving said rod.

2. A servo-mechanism unit as set forth in claim 1 wherein a pressure sensitive, regulating member is connected to said distributing device and said other tank to regulate the pressure of the fluid conducted from said other tank to the distributing device so that the actuating chamber is supplied with fluid under constant pressure in spite of variation of pressure in said other tank.

3. A servo-mechanism unit for movement of a rod as set forth in claim 1 further comprising a sheath fixed to said rod and having a portion of reduced diameter the length of which is substantially equal to the extent of which said rod is moved by said distortable diaphragm, an externally threaded crown having its internal periphery freely engaged on said reduced portion of said sheath, guide members cooperating with said threaded crown to prevent rotation thereof, a tapered sleeve screwed on said threaded crown and carried by bearings mounted on said tubular assembly and a handwheel integral with said sleeve whereby turning of the handwheel will cause said threaded crown to be raised or lowered and move said rod correspondingly when said threaded crown engages the sheath at the ends of the portion of reduced diameter.

4. A servo-mechanism unit for the movement of a load device comprising a rod movably carried by a tubular assembly, a casing, a distortable diaphragm closing said casing and connected to said rod, a lid fixed to said casing and covering said diaphragm to form therewith an operating chamber, an upper tank defined by said lid, said casing and an upper flexible diaphragm onto which atmospheric pressure is applied, a lower, high pressure tank, said upper and lower tanks being respectively located above and below said lid and defining two distinct chambers filled with a gaseous fluid, an electrically driven compressor located inside said upper tank to withdraw fluid therefrom and force said fluid into the lower tank, an electrically controlled fluid distributing mechanism for alternatively connecting said lower tank with said operating chamber and said latter chamber with said upper tank, and means for controlling the operation of said compressor according to the pressure in said lower tank.

5. A servo-mechanism unit as set forth in claim 4 wherein said upper tank is provided with a charge of lubricant for the lubrication of said electrically operated compressor, the lower portion of said lower tank being connected to a deoiling apparatus, said deoiling apparatus having a float and a valve controlled by said float and being connected by a duct to said upper tank for return of lubricant to the upper tank when the lubricant in said deoiling apparatus reaches a level sufficient to raise said float and operate said valve.

6. A servo-mechanism unit for movement of a load device comprising a rod, a tubular assembly for guiding said rod, said tubular assembly having a bellows at its upper part, a distortable diaphragm secured to the upper part of said bellows to close the tubular assembly, a spring member enclosed in said tubular assembly and mounted to urge said distortable diaphragm upwardly, a lid covering said distortable diaphragm and forming therewith an actuating chamber, a lower casing mounted about the upper portion of said tubular assembly and forming a first tank, a second casing carried by said lid and forming a second tank, said first and second tanks and said actuating chamber being filled with a charge of compressible fluid, an electrically operated compressor located in said first tank to withdraw fluid therein and force the fluid into the second tank whereby the fluid in the second tank is contained under high pressure, an element sensitive to the pressure in said second tank to stop and start said compressor so that the pressure is maintained substantially constant in the second tank, an electrically operated distributing device carried by said lip to supply fluid under pressure to said actuating chamber when energized and lower said distortable diaphragm and said rod against said spring, and a pressure regulator mounted in a conduit between said second tank and said distributing device functioning to supply said latter device with fluid at constant pressure.

7. A servo-mechanism unit for movement of a load device comprising a rod, a tube assembly in which said rod is located and guided, a casing at the upper end of said tube assembly into which said rod projects, a distortable diaphragm closing the upper end of said casing and to which said rod is fixed, a lower diaphragm connected to said rod and to said tube assembly forming a control chamber with said distortable diaphragm and casing, a lid covering said casing and distortable diaphragm and forming therewith an actuating chamber, an annular wall connecting said casing at its periphery and said tube assembly to form therewith a first tank, an envelope carried by said lid at its periphery and a cover closing the upper end of said envelope to form with said lid a second tank, said cover having a tubular extension traversing said second casing and opening into said actuating chamber, said control and actuating chambers, said first and second tanks being filled with a charge of compressible fluid, an electrically operated compressor located in said second tank from which fluid is sucked and pumped into said first tank to constitute the latter a high pressure chamber, a pressure sensitive element for operating said compressor as a function of the pressure prevailing in said first tank, an electrically operated distributing mechanism located in said tubular projection of said cover closing said second tank, a pressure regulator connecting said first tank and said distributing mechanism functioning to supply said actuating chamber with fluid under constant pressure, and a pneumatic reversing relay located within said second tank to control the supply of fluid to said control chamber according to the pressure prevailing in said actuating chamber whereby said distortable diaphragm is displaceable in opposite directions for driving said rod.

8. A servo-mechanism unit for the movement of a load device comprising a rod, a tubular assembly partially surrounding and guiding said rod, a distortable diaphragm closing one end of said tubular assembly and secured to said rod, a lid covering said distortable diaphragm and forming therewith an actuating chamber, a first tank, a second tank, said first and second tanks and said actuating chamber being filled with a charge of fluid, an electrically operated pumping device operative to withdraw fluid from the first tank and force said fluid into the second tank, an element sensitive to the pressure in said second tank to stop and start said pumping device so that pressure is maintained substantially constant in said second tank, and an electrically operated distributing device for conducting fluid from the second tank to said actuating chamber when actuated in one direction and to at least in part discharge fluid from said actuating chamber to said first tank when actuated in a second direction thus causing said diaphragm to be distorted successively in two directions for correspondingly moving said rod.

References Cited in the file of this patent

UNITED STATES PATENTS

| 2,577,874 | Carnahan | Dec. 11, 1951 |
| 2,644,307 | Blair | July 7, 1953 |
| 2,897,650 | Carlson | Aug. 4, 1959 |
| 2,948,118 | Carlson | Aug. 9, 1960 |

FOREIGN PATENTS

| 551,847 | Great Britain | Mar. 11, 1943 |
| 864,361 | Great Britain | Sept. 3, 1958 |